(12) United States Patent
Paradis et al.

(10) Patent No.: US 10,450,752 B2
(45) Date of Patent: *Oct. 22, 2019

(54) FIRE RESISTANT COMPOSITE BOARDS AND METHODS

(71) Applicant: JOHNS MANVILLE, Denver, CO (US)

(72) Inventors: Duane Paradis, Highlands Ranch, CO (US); Guodong Zheng, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 314 days.

This patent is subject to a terminal disclaimer.

(21) Appl. No.: 15/442,811

(22) Filed: Feb. 27, 2017

(65) Prior Publication Data

US 2017/0191270 A1     Jul. 6, 2017

Related U.S. Application Data

(63) Continuation of application No. 13/672,746, filed on Nov. 9, 2012, now Pat. No. 9,605,433.

(51) Int. Cl.
*E04D 1/28* (2006.01)
*E04D 3/35* (2006.01)
(Continued)

(52) U.S. Cl.
CPC .............. *E04D 3/352* (2013.01); *B32B 5/022* (2013.01); *B32B 5/18* (2013.01); *B32B 5/245* (2013.01); *B32B 7/12* (2013.01); *B32B 37/12* (2013.01); *B32B 37/18* (2013.01); *B32B 38/08* (2013.01); *E04B 7/00* (2013.01); *E04C 2/296* (2013.01); *E04D 1/28* (2013.01); *E04D 5/10* (2013.01); *E04D 13/1662* (2013.01); *B32B 2260/023* (2013.01); *B32B 2260/044* (2013.01); *B32B 2262/101* (2013.01); *B32B 2266/0257* (2013.01); *B32B 2305/022* (2013.01); *B32B 2305/07* (2013.01); *B32B 2305/08* (2013.01);
(Continued)

(58) Field of Classification Search
None
See application file for complete search history.

(56) References Cited

U.S. PATENT DOCUMENTS 2,640,786 A * 6/1953 Parsons .................. C08L 95/00
                                                    106/282
2,718,479 A * 9/1955 Bierly ....................... D21J 1/00
                                                    106/18.23
(Continued)

*Primary Examiner* — Robert Canfield
(74) *Attorney, Agent, or Firm* — Robert D. Touslee

(57) ABSTRACT

Embodiments of the invention provide roofing boards and roofing systems having improved fire resistance properties and methods related to the same. According to one aspect, a roofing system is provided. The roofing system includes roofing panels positioned atop structural support members to form a roof deck. Roofing boards are positioned atop the roof deck and coupled thereto and a roofing membrane is positioned atop the roofing boards and coupled therewith. The roofing boards include a coating of a mineral based material applied to one or more surfaces in an amount between the range of about 0.10 lbs/ft$^2$ and about 0.70 lbs/ft$^2$. The mineral based material coating enables the roofing boards to pass the UL 790 class A tests, such as the burning brand test.

20 Claims, 6 Drawing Sheets

(51) Int. Cl.
  *E04B 7/00* (2006.01)
  *B32B 5/00* (2006.01)
  *E04D 13/16* (2006.01)
  *B32B 5/02* (2006.01)
  *B32B 5/18* (2006.01)
  *B32B 5/24* (2006.01)
  *B32B 7/12* (2006.01)
  *B32B 37/12* (2006.01)
  *B32B 37/18* (2006.01)
  *B32B 38/08* (2006.01)
  *E04C 2/296* (2006.01)
  *E04D 5/10* (2006.01)
  *E04B 1/94* (2006.01)
  *E04B 2/00* (2006.01)

(52) U.S. Cl.
  CPC . *B32B 2307/3065* (2013.01); *B32B 2315/085* (2013.01); *B32B 2377/00* (2013.01); *B32B 2419/06* (2013.01); *E04B 1/942* (2013.01); *E04C 2/44* (2013.01); *E04D 3/351* (2013.01); *E04D 13/165* (2013.01); *Y10T 156/10* (2015.01)

(56) References Cited

U.S. PATENT DOCUMENTS

| | | | | |
|---|---|---|---|---|
| 3,180,783 A * | 4/1965 | Walker | | C08L 95/00 156/71 |
| 3,193,439 A * | 7/1965 | Price | | E04D 5/10 428/139 |
| 3,365,322 A * | 1/1968 | Hinds | | E04D 1/26 428/145 |
| 3,411,256 A * | 11/1968 | Best | | E04D 3/351 428/314.4 |
| 4,117,199 A | 9/1978 | Gotoh et al. | | |
| 4,303,722 A | 12/1981 | Pilgrim | | |
| RE31,007 E * | 8/1982 | Best | | E04D 3/351 52/408 |
| 4,357,377 A | 11/1982 | Yamamoto et al. | | |
| 4,425,746 A * | 1/1984 | Bonaguidi | | E04D 11/02 52/309.12 |
| 4,441,944 A | 4/1984 | Massey | | |
| 4,572,862 A * | 2/1986 | Ellis | | C04B 28/02 106/686 |
| 4,766,024 A | 8/1988 | Nath et al. | | |
| 4,774,794 A * | 10/1988 | Grieb | | E04B 7/225 52/309.12 |
| 4,904,510 A | 2/1990 | Nath et al. | | |
| 4,948,655 A | 8/1990 | Danese | | |
| 5,059,264 A | 10/1991 | Sheets | | |
| 5,112,678 A | 5/1992 | Gay et al. | | |
| 5,130,184 A * | 7/1992 | Ellis | | C04B 28/30 106/18.12 |
| 5,401,588 A * | 3/1995 | Garvey | | C04B 14/38 428/172 |
| 5,406,765 A | 4/1995 | Brown | | |
| 5,462,699 A | 10/1995 | Montgomery | | |
| 5,502,940 A | 4/1996 | Fifield | | |
| 5,540,022 A * | 7/1996 | Morris | | B05C 11/023 52/309.8 |
| 5,552,187 A | 9/1996 | Green et al. | | |
| 5,600,929 A | 2/1997 | Morris | | |
| 5,749,954 A | 5/1998 | Law et al. | | |
| 6,149,831 A | 11/2000 | DePorter | | |
| 6,177,024 B1 | 1/2001 | Sandoval et al. | | |
| 7,338,702 B2 | 3/2008 | Swales et al. | | |
| 7,553,780 B2 | 6/2009 | Smith | | |
| 2003/0203191 A1 | 10/2003 | Randall et al. | | |
| 2005/0066620 A1 | 3/2005 | Albora | | |
| 2006/0260237 A1* | 11/2006 | Griffin | | E04C 2/296 52/409 |
| 2006/0275561 A1* | 12/2006 | Agrawal | | B32B 5/18 428/2 |
| 2006/0276093 A1* | 12/2006 | Agrawal | | B32B 5/18 442/374 |
| 2007/0054129 A1 | 3/2007 | Kalkanoglu et al. | | |
| 2007/0261337 A1 | 11/2007 | Whitaker et al. | | |
| 2008/0124530 A1 | 5/2008 | Paradis | | |
| 2008/0127587 A1 | 6/2008 | McIntire | | |
| 2008/0250741 A1* | 10/2008 | Bennett | | C08L 97/02 52/506.01 |
| 2009/0208714 A1* | 8/2009 | Currier | | B28B 1/52 428/212 |
| 2009/0263673 A1 | 10/2009 | Yeung et al. | | |
| 2010/0087560 A1 | 4/2010 | Crain et al. | | |
| 2010/0269440 A1* | 10/2010 | Torres | | E04D 1/08 52/309.4 |
| 2011/0011021 A1 | 1/2011 | LaVietes et al. | | |
| 2011/0173911 A1 | 7/2011 | Propst | | |
| 2011/0296794 A1 | 12/2011 | Thomas et al. | | |
| 2012/0040165 A1 | 2/2012 | Dubey | | |
| 2013/0305642 A1 | 11/2013 | Propst | | |
| 2014/0150362 A1 | 6/2014 | Propst | | |
| 2014/0260074 A1 | 9/2014 | Johnson et al. | | |
| 2016/0010336 A1* | 1/2016 | Kelly | | E04D 3/02 52/408 |
| 2016/0305126 A1 | 10/2016 | Johnson et al. | | |
| 2017/0233587 A1* | 8/2017 | McKee | | C09D 5/18 136/244 |
| 2018/0135302 A1* | 5/2018 | Verhoff | | B32B 7/12 |

\* cited by examiner

FIRE RESISTANT COMPOSITE BOARDS AND METHODS

CROSS REFERENCE TO RELATED APPLICATION

The present application is a continuation of pending U.S. Nonprovisional patent application Ser. No. 13/672,746, filed Nov. 9, 2012.

BACKGROUND OF THE INVENTION

Roofing systems often include multiple components that are coupled together to perform various functions. For example, roofing systems commonly include a roof deck, which may be wood or metal, insulation and/or cover boards, and a roofing membrane. The various components may be coupled via mechanical fasteners, adhesive bonding, ballasting, and the like. The roof deck often provides a surface upon which the other components are placed and the roofing membrane often provides functional value and/or aesthetic appeal, such as weather proofing the roofing system and providing a relatively smooth, flat, and exceptional surface.

An important role of one or more internally located components, such as insulation and/or cover boards, is to resist the spread of a fire. These boards, which are often made of plywood, perlite, polyisocyanurate or other foams, and the like, are often required to pass one or more tests that are specifically designed to test the board's resistance to fires. One such test is the Underwriters Laboratory 790 Class A tests, which are based on ASTM E108. One of these tests involves placing a brand atop an assembled roofing system and burning the brand to determine the presence of fire, ambers, and/or smoke beneath a roof deck. Internal boards often fail this test due to being porous or otherwise allowing air and/or flames to flow to or near a ⅛ inch gap created in the plywood roof deck. Accordingly, improved roofing boards are needed that are able to pass this test and/or ensure fire hazard safety.

BRIEF SUMMARY OF THE INVENTION

Embodiments of the invention provide roofing boards having improved fire resistant properties. The roofing boards may have one or more mineral based coated surfaces or facers that limit air flow through or adjacent the roofing boards to provide improved fire resistance. The mineral based coatings enable the roofing boards to pas UL 790 Class A tests, such as the burning brand test.

According to one aspect, a roofing system is provided. The roofing system includes a plurality of roofing panels or boards positioned atop and coupled to roofing joists or other structural support members to form a roof deck. A plurality of porous roofing boards or composite foam boards are positioned atop the roof deck and coupled thereto. The porous roofing boards or composite foam boards include a coating of a mineral based material applied to one or more major surfaces of the boards. The mineral based material is applied in an amount between the range of about 0.05 lbs/ft² and 0.70 lbs/ft² in one embodiment, and between about 0.10 lbs/ft² and about 0.70 lbs/ft² in another embodiment. The mineral based material is applied in an amount sufficient to enable the porous roofing boards or composite foam boards to pass the UL 790 class A tests. A roofing membrane is positioned atop the porous roofing boards or composite foam boards and coupled therewith. According to one embodiment, the porous roofing boards or foam composite foam boards may include a glass fiber mat coupled with a major surface of the respective board. The glass fiber mat may be saturated with the mineral based material.

According to another aspect, a roofing board is provided. The roofing board includes a mineral based material coating on one or more major surfaces of the roofing board. The mineral based material coating may have a coating weight of at least 0.10 lbs/ft² that enables the roofing board to pass the UL 790 class A tests.

The roofing board may include a glass mat facer applied to one or more major surfaces and the mineral based material may be applied to the glass mat facer. In some embodiments, the roofing board includes two glass mat facers applied on opposite major surfaces of the roofing board. In such embodiments, a first glass mat facer may have a coating weight of at least 0.10 lbs/ft² of the mineral based material (more commonly at least 0.14 lbs/ft² of the mineral based material) and a second glass mat facer may have a coating weight of less than 0.10 lbs/ft² of the mineral based material (often less than 0.12 or 0.14 lbs/ft² of the mineral based material). The first glass mat facer may have a first glass mat weight and the second glass mat facer may have a second glass mat weight that is less than the first glass mat weight. In some embodiments, the glass mat facer may have a weight of at least 1.4 lbs/100 ft², and more commonly about 2.1 lbs/100 ft². In other embodiments, such as those involving the use or perlite board, the glass mat may have a weight of about 0.9 lbs/100 ft² or more.

The mineral based material may include a composition having between about 25% and 50% water and between about 50% and 75% solid materials. The solid material composition may include a combination of a first filler material and a second filler material. The first filler material may include one or more of: calcium carbonate, perlite, clay, gypsum, and the like; and the second filler material may include one or more of: clay, mica, talc, perlite, expanded perlite fines, flumed silica, fly ash, fiber glass, vermiculite, titanium dioxide, zinc oxide, and the like.

The mineral based material coating may have a coating weight of at least 0.14 lbs/ft² in some embodiments. In other embodiments, the mineral based material coating may have a coating weight of between about 0.18 lbs/ft² and about 0.21 lbs/ft². These coating weight ranges may be preferred for embodiments involving foam based roofing boards. In other embodiments, such as those involving perlite roofing boards, the mineral based material coating may have a coating weight of 0.05 lbs/ft² or more. In an exemplary embodiment, the mineral based material coating of a perlite roofing board may have a coating weight of between about 0.11 lbs/ft² and 0.18 lbs/ft². In some embodiments, the mineral based material may include calcium carbonate and an acrylic binder and may or may not include a fire retardant additive.

The roofing board may be between about ¼ inch thick and 6 inches thick depending on the need and/or required usage. The roofing board may also have a density of between about 1 lb/ft³ and about 15 lbs/ft³. The roofing board may be composed of one or more of the following materials: wood fibers, perlite, polyisocyanurate, polystyrene, extruded polystyrene, cellular glass, gypsum, cement boards, magnesium oxide, pressed recycled paper, particles, and the like. In specific embodiments, a foam roofing board may have a density between about 1.5 lbs/ft³ and 12 lbs/ft³, although densities within the range of 1.5 lbs/ft³ and 8 lbs/ft³ are more common. Similarly, a perlite roofing board may have a density range of between about 8 lbs/ft³ and 30 lbs/ft³, although a range of between 9 lbs/ft$^3$ and 18 lbs/ft$^3$ is more common. Further, a wood roofing board may have a fiber density range between about 15 lbs/ft$^3$ and 25 lbs/ft$^3$. Gypsum, cement, mag oxide, and the like typically have density ranges higher than those listed.

According to another aspect, a composite perlite roofing board is provided. The composite perlite roofing board includes a composite core material having roughly between 40% and 70% of expanded perlite, between 30% and 60% of paper products (may be recycled paper products), between 1.5% and 10% of a starch binder, and between 1.0-1.5% and 5% asphalt. A glass mat facer is coupled with one surface of the composite core to reinforce the composite perlite roofing board. The glass mat facer may have a mat weight of between about 0.9 and 3.0 lbs/100 ft$^2$ in one embodiment, and a mat weight of between about 1.4 and 2.0 lbs/100 ft$^2$ in another embodiment. The glass mat facer reinforcement may strengthen the composite perlite roofing board so as to help prevent wind uplift and/or for various other reasons.

In some embodiments, a mineral based coating material may be applied to the glass mat facer. The mineral based coating material may enable the composite perlite roofing board to pass the UL 790 Class A tests. The glass fiber mat may have a mat weight of at least 0.9 lbs/100 ft$^2$ in one embodiment, and at least 1.4 lbs/100 ft$^2$ in another embodiment, and the mineral based material coating may have a coating weight of at least 8 to 15 lbs/100 ft$^2$ in one embodiment, 10 to 12 lbs/100 ft$^2$ in another embodiment, and more commonly about 12 lbs/100 ft$^2$.

According to another embodiment, a method of manufacturing a roofing board is provided. According to the method, a roofing board may be provided and a mineral based material may be applied to at least one major surface of the roofing board. The mineral based material may be applied so that the roofing board has a coating weight of at least 0.10 lbs/ft$^2$. The mineral based coating may enable the roofing board to pass the UL 790 class A tests, which is otherwise difficult with similar conventional roofing boards.

According to one embodiment, a glass mat may be applied to or coupled with at least one major surface of the roofing board so that the major surface is faced with the glass mat. The mineral based material may be applied to the faced glass mat surface of the roofing board. In some embodiments, a second glass mat may be applied to the other major surface of the roofing board so that both major surfaces of the roofing board are faced with a glass mat. A coating may also be applied to the other faced glass mat surface of the roofing board (i.e., to the second glass mat). The coating may be applied so as to have a coating weight of less than 0.10 lbs/ft$^2$. Stated differently, the first glass mat and second glass mat may have different coating weights and/or coating materials. The faced glass mat surface having a coating weight of at least 0.10 lbs/ft$^2$ may be positioned with respect to a roof deck so as to face the roof deck.

According to another aspect, a method of manufacturing a roofing board is provided. The method may include applying a mineral based material to a glass mat having a mat weight of at least 1.4 lbs/100 ft$^2$. The mineral based material may be applied so that the glass mat includes a coating weight of at least 0.10 lbs/ft$^2$. The method may also include pouring a foam material over the coated glass mat, or laminating a foam core with the coated glass mat, wherein the foam material forms the roofing board. The method may further include applying a second coated glass mat to an opposite surface of the foam roofing board so that the foam roofing board is sandwiched between two coated glass mats. The second coated glass mat may have a mat weight less than the other or first coated glass mat.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the invention provide fire resistant roofing boards and methods for manufacturing or producing the same. According to some embodiments, the roofing board may be made of a foam composite material or a porous material. The roofing boards enable a roofing system to pass the Underwriters Laboratory 790 Class A test, which is also sometimes called the UL 790 Class A test over a combustible roof deck, UL 790 Class A burning brand test, and the like, which is based on ASTM E108 (hereinafter the UL 790 Class A burning brand test or simply the burning brand test). The test protocol typically requires the following, 1) Spread of Flame, 2) Intermittent Flame and 3) Burning Brand tests. The latter two tests often use a wood deck that contains three pieces of plywood fastened to a wood frame with ⅛ inch gaps between plywood joints. The Spread of Flame test uses one sheet of plywood with no gaps.

Figure 3A:
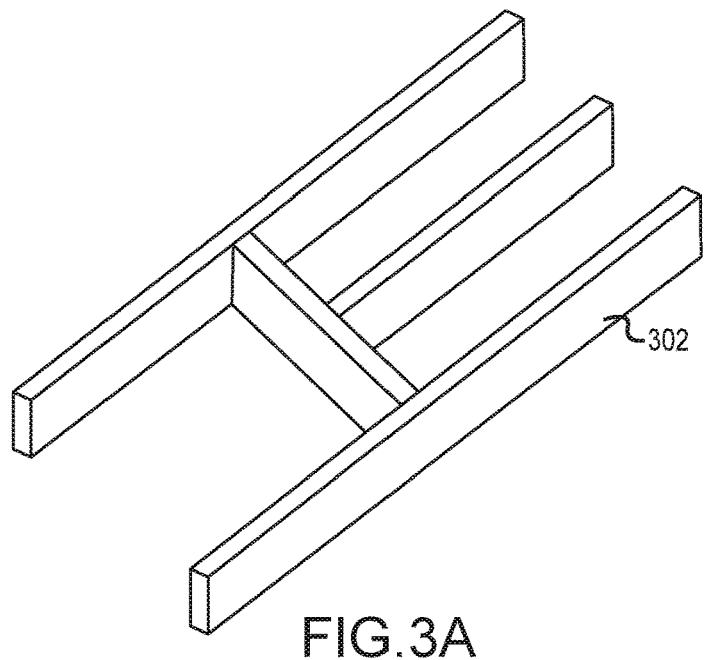
FIGS. 3A-E illustrate a setup for Underwriters Laboratory 790 class A burning brand test according to an embodiment of the invention.
Figure 3B:
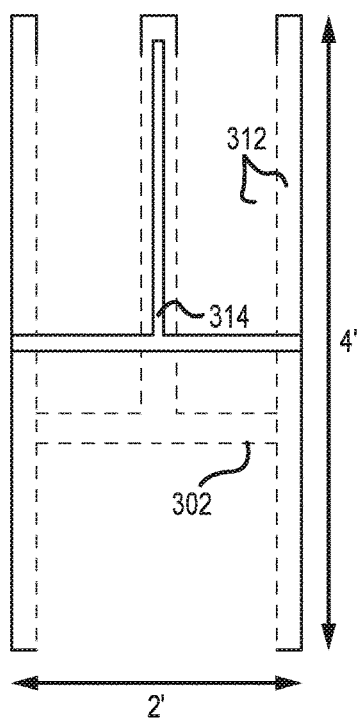
Figure 3C:
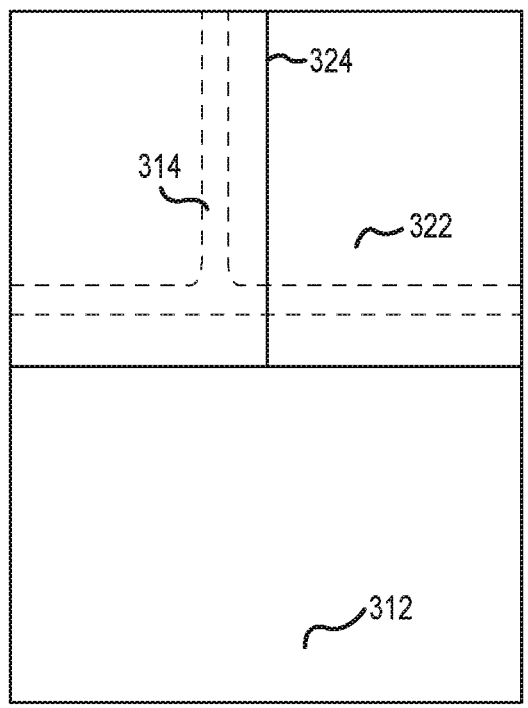
Figure 3D:
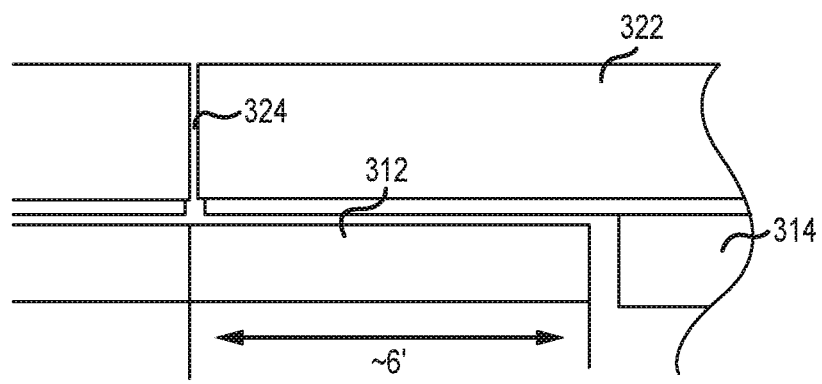
Figure 3E:
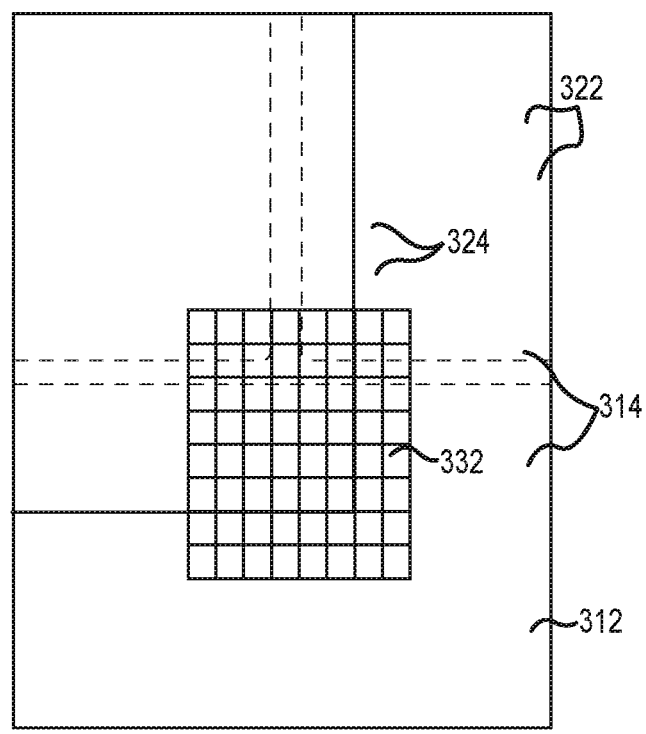

The UL 790 Class A burning brand test is depicted in FIGS. 3A-3E. The roof system to be tested is placed on top of a plywood deck 312 and frame 302 and the cover board 322 or underlying insulation is cut into 3 pieces and joints 324 are offset (e.g., 6 inches) from the plywood joints 312 as shown in FIG. 3D. Fasteners (not shown) are used at corners of roofing boards to hold in place. Frame 302 is typically constructed from 2×4 inch wood posts. Plywood deck 312 is attached to frame 302 with ⅛ inch gaps 314 between adjacent plywood boards as shown in FIG. 3B.

Cover board 322 is attached atop plywood deck 312 with adjacent cover boards pieces butted together and joints 324 offset from joints 314. In another embodiment, polyisocyanurate foam insulation boards (polyiso boards) may be used instead of the cover board 322. The polyiso boards may be a foam density of about 1.5 to 2.0 pcf, and may be between about ¼ to 6 inch thick. In yet another embodiment a polyiso foam cover board may be used having a foam density of between about 4 to 8 pcf (commonly for polyiso boards having a thickness of ¼ to ½ inch). For ease in described the embodiments, these and other boards will be generally referred to as cover boards 322. The brand 332 is typically placed atop the cover boards 322. To pass the burning brand test, the brand 332 must be 100% consumed with no flame visible on underside of wood roof deck 312 at any point during the test. The test will continue as long as smoke and/or ambers are present.

The plywood joints 314 and roofing board joints 324 present a challenge for porous roofing boards or foam composite boards with thinner or porous facers that do not provide sufficient fire resistance and resistance to air flow from the ⅛ inch plywood joints 314. In order to pass the burning brand test, the roofing board must often resist shrinkage under extreme heat and provide a barrier to prevent flame from penetrating the wood roof deck 312, especially at the ⅛ inch joints 314. For conventional porous and foam composite boards, failure typically occurs before the brand is fully consumed with a flame appearing underneath the wood deck at the joint 314.

According to one embodiment, porous or composite fire resistant boards are described. The porous boards include a mineral based coating that limits the amount of air flow through the board to a roof deck positioned under the porous boards. The limited air flow may allow the boards to pass the UL 790 Class A burning brand test. The porous boards may be fibrous boards that usually fail the burning brand test even when a fire retardant material is used with the board. Conventional boards usually fail due to the high passage of air through or approximate to the board. For example, with conventional boards, gaps may form between the boards and the roof deck, which may provide a clear path for fire to penetrate to the underlying roof deck.

According to one embodiment, a fire resistant porous board may include a perlite board having a composition of roughly 40-70% expanded perlite, 30-60% recycled paper products, 1.5-10% starch binder, 1.0-5% asphalt, and the like. The fire resistant porous board may be between about ¼ inch and 3 inches, although ½ to 1.5 inches is more common, and may be used as a roofing cover board, a roofing recover board, a fire resistant roof substrate over roof decks, and the like. Fire resistant roof substrates typically require significantly improved fire resistance over other cover board and often must be able to pass UL 790 Class A test. The plywood joints and roofing board joints often present a challenge for porous roofing boards, such as perlite based cover boards, since air can flow through plywood joints to feed fire above. Conventional perlite, cellulose, or wood fiber based cover boards often cannot pass the Class A burning brand and/or intermittent flame tests. With perlite based cover boards, failure often first occurs at the plywood joints where flames penetrate through the board and appear underneath the wood deck within the plywood joints.

For example, with a ½ inch thick perlite board, Class A burning brand test failure usually occurs within 10 to 15 minutes when the brand is only approximately 50% consumed. Although perlite boards are often fire resistant due to a high expanded perlite content, they are porous and allow air to permeate through the board which helps fuel fire on top of the board from spaces or areas underneath, thereby accelerating penetration of a flame through the board and gaps in the wood deck.

Embodiments of the invention improve the fire resistance of perlite and other porous boards as required for the UL 790 Class A tests. The fire resistance of these boards is improved by minimizing air flow through the board from gaps in the underlying wood deck. According to one embodiment, the air flow is minimized by coating the porous boards with a mineral based material, which may be a relatively inexpensive material. The mineral based coating may provide sufficient resistance to air permeation, thereby suffocating a fire as it penetrates through the board during the burning brand and intermittent flame tests.

In one embodiment, the mineral based coating is only applied to one side of the board. The coated side is then oriented towards the wood deck so that the coating layer bridges the plywood joints, thereby suffocating the fire above. In another embodiment, both sides of the board are coated with the mineral based material, which may further suffocate a fire. The mineral based coating materials are often relatively heat and/or fire resistant. Exemplary mineral based materials include calcium carbonate, clay, perlite, fiber glass, silica, fly ash, ceramic spheres, cement, gypsum, and the like.

Porous boards coated with such materials in the manner described herein achieve significant improvements in fire resistance as measured by burning brand and intermittent flame tests. For example, with a calcium carbonate based coating using a sodium silicate binder, a ½ inch perlite board containing approximately 40% cellulose fiber was able to pass the burning brand test with approximately 0.1 lbs/ft$^2$ of coating (e.g., 3.2 lbs per a 4 foot by 8 foot board). Similarly, using a cementitous coating, 0.2 lbs/ft$^2$ also enabled a coated ½ inch perlite board to pass the burning brand test.

According to one embodiment, the addition of fire retardants (e.g., sodium borate, aluminum trihydrate, and the like) in the coating may reduce the coat weight needed for the porous boards to pass the UL Class A tests. The addition of such fire retardants, however, is not needed and may add additional and unneeded expense.

According to some embodiments, the mineral based material coatings can be spray applied or metered onto the porous boards at desired weight and/or thicknesses. The coatings can be reinforced with glass fibers and additional binders to improve mechanical properties of the board and to mitigate cracking when using heavier coatings.

For convenience, the porous boards described herein will be generally referred to as perlite boards. It should be realized, however, that the porous boards embodied herein are not limited to perlite boards, but may include virtually any porous board. Examples of other porous boards that may be coated with a mineral based material to improve the fire resistance of such boards include boards having various compositions of wood fibers, perlite, cellular glass, pressed recycled paper, particle board, and the like.

According to another embodiment, the porous board may include a facer material that improves the strength characteristics of the board. Roofing cover boards are often subjected to wind loads and must meet specific wind resistance performance criteria, such as those dictated by Factory Mutual and other building code agencies. An exemplary board may include a perlite/fiber core with an outer facing consisting of a non-woven mat and/or scrim adhered to the perlite/fiber core. The outer facing may improve the strength of the board and/or other properties of the board. For example, the outer facing may improve the wind uplift resistance of the board and/or tensile (flexural) strength of the board due to the high tensile strength of the outer facing. The outer facing may include a plurality of intermeshed glass fibers. According to one embodiment, the glass fiber mat or scrim may have a weight of between about 0.5 lbs/100 ft$^2$ and about 4 lbs/100 ft$^2$, although a mat/scrim weight of between about 0.9 lbs/100 ft$^2$ and 3 lbs/100 ft$^2$ is more common.

As described previously, the porous board may have a composition of roughly 40-70% expanded perlite, 30-60% recycled paper products, 1.5-10% starch binder, 1.0-5% asphalt, and the like. The porous board is typically between about ¼ inch and 4 inches in thickness, although ½ to 1.5 inches is more common. The perlite core may also include various wood fibers, soluble fibers, or other types of fibers. As described previously, the board may be used as a roofing cover board, roofing recover board, insulation and/or fire resistant roof substrate for roof decks, and the like.

According to one embodiment, the outer facer (e.g., glass fiber mat/scrim) may be coated with the mineral based material described herein. The mineral based coating may provide the fire resistant properties described herein. Thus, the resulting board may include a combination of improved strength properties and fire resistant properties. The use of the outer facer may reduce the amount of mineral based material that needs to be applied by providing a relatively flat and/or smooth outer surface. In some embodiments, the overall weight of the resulting board may be reduced by using the outer facer and reduced mineral based coating. The glass mat or scrim may provide structural support to the mineral based material coating by preventing the board from significantly shrinking during the UL Class A burning brand test.

In some embodiments, improved fire performance can be achieved by reducing the fiber content in the board's core, increasing the glass mat weight, and/or increasing the coating weight. Further, fire retardants can be used in the mineral based coating to further enhance fire resistance, although such additives are not needed and not included in various embodiments.

According to another embodiment, a foam core roofing board having improved fire resistant properties is provided. The foam core roofing board (hereinafter foam roofing boards or foam composite boards) includes one or more outer facers that are heavily coated with the mineral based material described herein. These heavily coated facers allow the foam roofing boards to pass the UL Class A burning brand tests.

Conventional foam boards typically include light facer materials that routinely fail the UL Class A burning brand tests. These conventional foam boards often fail the burning brand test 10 to 20 minutes prior to the brand being fully consumed. The mode of failure is typically the formation of large gaps between the foam composite boards and the underlying facer that is in contact with the wood or metal roof deck. Stated differently, gaps begin to form between the roof deck and the facer material. These gaps provide a clear path for fire and/or air to penetrate to the ⅛ inch plywood joint and through these joints to the underlying roof deck. Typically, once the bottom facer fails at or near the plywood joint, air fuels the fire and flames develop underneath the wood deck resulting in a failure of the UL Class A burning brand test. The formation of such gaps is limited or minimized with the heavily coated facer of the foam composite boards described herein, thus allowing these boards to pass the UL Class A burning brand test. Gap formation may be minimized as a result of the heavily coated facer minimizing the shrinkage of the foam composite board when exposed to the fire's heat and/or flame.

According to one embodiment, a foam composite board includes a polyisocyanurate foam core having a density of between about 1.5 and 12 lbs/100 ft$^3$. The thickness and/or density of the foam may be varied depending on the ultimate use of the foam composite board. For example, ¼ to ½ inch thick boards can be produced with high foam densities (e.g., commonly 4 to 8 lbs/100 ft$^3$, although densities of up to 25 lbs/100 ft$^3$ are possible) for cover board applications where impact resistance is required. Alternatively, lower density and thicker foam boards (e.g., ½ to 4 inches) with higher R values may be used for insulation purposes.

The polyisocyanurate foam core may be faced on one or both sides with a glass mat, which may be coated with a relatively light or heavy mineral based coating. The heavy coating may include coatings having a coating weight of at least 10 lbs/100 ft$^2$ (i.e., 0.10 lbs/ft$^2$). The light coating may be any coating having a coating weight of less than 10 lbs/100 ft$^2$ (i.e., less than 0.10 lbs/ft$^2$). In some embodiment, the heavy coating weight may be anything more than about 5 lbs/100 ft$^2$ (i.e., 0.05 lbs/ft$^2$). According to another embodiment, the heavy coating includes any coating weight of 14 lbs/100 ft$^2$ (i.e., 0.14 lbs/ft$^2$) or more. The weight and/or thickness of the glass mat may also be increased compared with conventional foam composite boards.

According to one embodiment, the foam composite board includes only a single heavily coated facer, which is typically placed in contact with the roof deck. The heavily coated facer minimizes the formation of gaps by limiting the amount of shrinkage the foam composite board experiences when exposed to a fire's heat and/or flame, thus suffocating a fire above. These foam composite boards may include conventional light coated glass facers on a top surface. According to another embodiment, the foam composite board includes two heavily coated facers. The heavily coated foam composite boards may not require the use of a fire retardant, although a fire retardant may be used in some embodiments, which may reduce the amount of the mineral based material that needs to be applied. In another embodiment, the foam composite board and heavily coated facer may be placed over underlying insulation and still pass the burning brand test.

Figure 1:
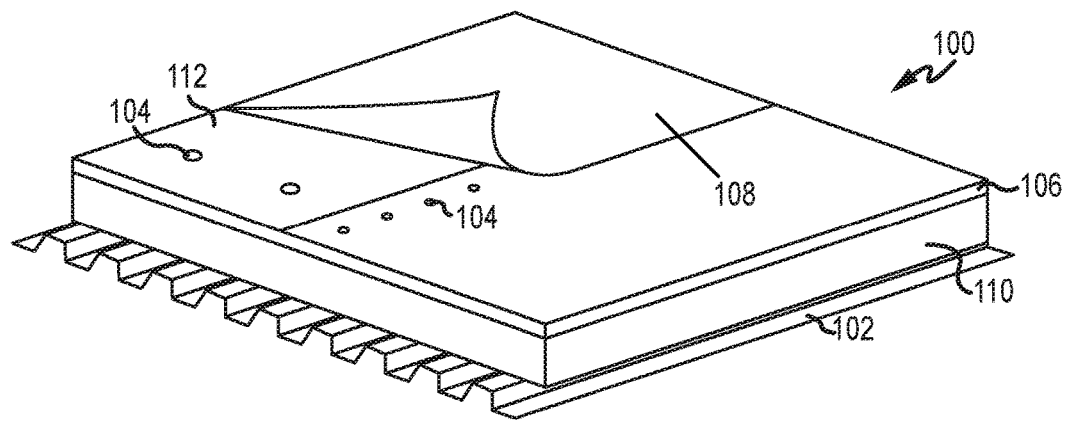
FIG. 1 illustrates a roofing system according to an embodiment of the invention.

Having described several embodiments, additional aspects of the invention will be more evident with reference to the figures. Referring now to FIG. 1, illustrated is a roofing system 100 that may be placed atop a building or other structure. System 100 includes a roof deck 102, which may include a plurality of roofing panels or boards that are positioned atop roofing joists or other structural support members and coupled thereto. The roofing panels/board, and thus the roof deck 102, may be made of various wood boards, corrugated metal, plywood, oriented strand board (OSB), concrete, reinforced concrete, and the like. Many buildings include metal or corrugated metal roof decks, such as 18 to 22 gauge steel. As described herein, the UL 790 Class A test typically uses plywood boards to simulate a roof deck.

A plurality of roof insulation type boards 110 are typically positioned and arranged atop roof deck 102. The roofing insulation board 110 may be composed of various fiber materials, foam materials, and the like, and may be selected based on a thermal resistance (R Value) provided, compressive and/or other strength provided, and the like. Common insulation boards 110 include wood fiber board, perlite boards, polyisocyanurate foam boards, expanded polystyrene foam boards, extruded polystyrene foam boards, cellular glass boards, gypsum boards, and the like. The insulation boards 110 are typically between about ¼ inch and 6 inches thick or more depending on insulation needs and other needs.

The insulation board 110 may be coupled with roof deck 102 via mechanical fasteners 104, via ballasts (not shown), via adhesive bonding, and the like. Although not common, in some embodiments, system 100 may not include insulation board 110. In some embodiments, a vapor barrier (not shown) may be applied to the roofing deck 102 between the deck and the insulation boards 110.

According to some embodiments, a plurality of cover boards 106 may optionally be positioned atop the insulation boards 110. The cover boards 106 are often thinner and/or denser boards than the insulation boards 110 that provide a relatively flat surface to which roofing membranes 108, wood or asphalt shingles, and the like may be attached. The density of the cover boards 106 may vary based on the material used. For example, cover boards comprising gypsum, wood fiber, OSB, and the like, are typically considerably denser than the insulation boards. Cover boards 106 typically are boards that are designed to provide a protective layer for the insulation boards 110 while coupling with a protective outer layer, such as the roofing membrane 108 or roof shingles. Exemplary cover boards include OSB, plywood, perlite, high density foam boards (e.g., polyisocyanurate), and the like. The cover board 106 may be coupled with insulation board 110 and/or roof deck 102 via mechanical fasteners 104, via ballasts (not shown), via adhesive bonding, and the like.

In some embodiments, system 100 includes either the insulation boards 110 or cover board 106, but not both. In yet other embodiments, the arrangement of the cover board 106 and insulation board 110 may be reversed so that the insulation boards 110 are positioned atop the cover boards 106. Various configurations are possible depending on the need and specific roofing application.

A roofing membrane 108 may be coupled with a top surface 112 of cover board 106 or insulation board 110. The roofing membrane 108 may protect the underlying roofing layers, such as by sealing the layers from rain and other environmental factors, and/or may provide other functional or aesthetic purposes. For example, the roofing membrane 108 may provide a brilliant white aesthetically pleasing look and may reduce urban heat island effects by reflecting radiation. According to one embodiment, the roofing membrane 108 may be made of polyvinyl chloride (PVC), thermoplastic polyolefin (TPO), ethylene proplylene diene monomer rubber (EPDM), bitumen, and the like. Roofing membrane 108 may be mechanically fastened, ballasted, adhered, and the like, to the top surface 112. A common method of coupling adjacent roofing membranes 108 includes heat welding the adjacent membranes. According to another embodiment, the roofing shingles may be coupled with top surface 112 instead of roofing membrane 108.

According to one embodiment, the insulation board 110 and/or cover board 106 may include a coating of a mineral based material applied to one or more major surfaces. As used herein, the term "major surface" means a relatively large and often relatively flat surface of the board. For example, a roofing board typically has two large and relatively flat surfaces (i.e., the top and bottom surfaces) that are bordered by small edge surfaces. The mineral based material coating may limit the penetration of air and/or flame through the insulation board 110 and/or cover board 106 so as to resist the spread of a fire through the roof surface. According to one embodiment, the coated surface may be positioned directly above and adjacent the roof deck 102 to limit the flow of air and/or the spread of a flame directly above the roof deck 102. Stated differently, the mineral based material coating may be positioned directly adjacent the roof deck 102.

In another embodiment, both major surfaces of the insulation board 110 and/or cover board 106 may include a mineral based material coating to further restrict air flow and/or a flame spread through the coated board. Typically either the insulation board 110 or cover board 106 includes the mineral based coating, but in some embodiments both boards may include the mineral based coating on one or more surfaces. Further, as described above, cover board 106 may be positioned directly adjacent roof deck 102 in some embodiments. Accordingly, a coated surface of cover board 102 may be positioned directly adjacent roof deck 102.

The mineral based material being applied to the insulation board 110 and/or cover board 106 in an amount ranging between about 0.05 lbs/ft$^2$ and about 0.50 lbs/ft$^2$, although a minimum amount of about 0.10 lbs/ft$^2$, and a range of between about 0.10 lbs/ft$^2$ and 0.30 or 0.20 lbs/ft$^2$ is more common. The mineral based material coating is sufficient to enable the coated insulation board 110 and/or cover board 106 to pass the UL 790 class A tests, and especially the burning brand test. Conventional insulation boards and cover boards, which may include light material coatings, often fail these tests early in the testing process due to the relatively high air flow through, or with respect to, the boards and due to the accompanying flame spread. Air flow through or with respect to the conventional boards may be due to the porosity of the boards, shrinkage from heat and/or flame exposure, and the like. The above described coating ranges adequately restrict airflow through or with respect to the boards to allow the boards to pass these tests.

According to some embodiments, the coated insulation boards 110 and/or cover boards 106 may also include a nonwoven facer that may be coated with the mineral based coating in the described amounts. The nonwoven facer may strengthen and/or reinforce the boards. According to one embodiment, the nonwoven facer may include glass fibers and may have a mat weight of between about 0.9 lbs/100 ft$^2$ and 4.0 lbs/100 ft$^2$, although a mat weight of between about 1.4 lbs/100 ft$^2$ and 2.0 lbs/100 ft$^2$ is more common. The glass fiber mat facer may be coated with the mineral based coating to both reinforce the board and provide the fire resistant properties described herein.

Figure 2A:
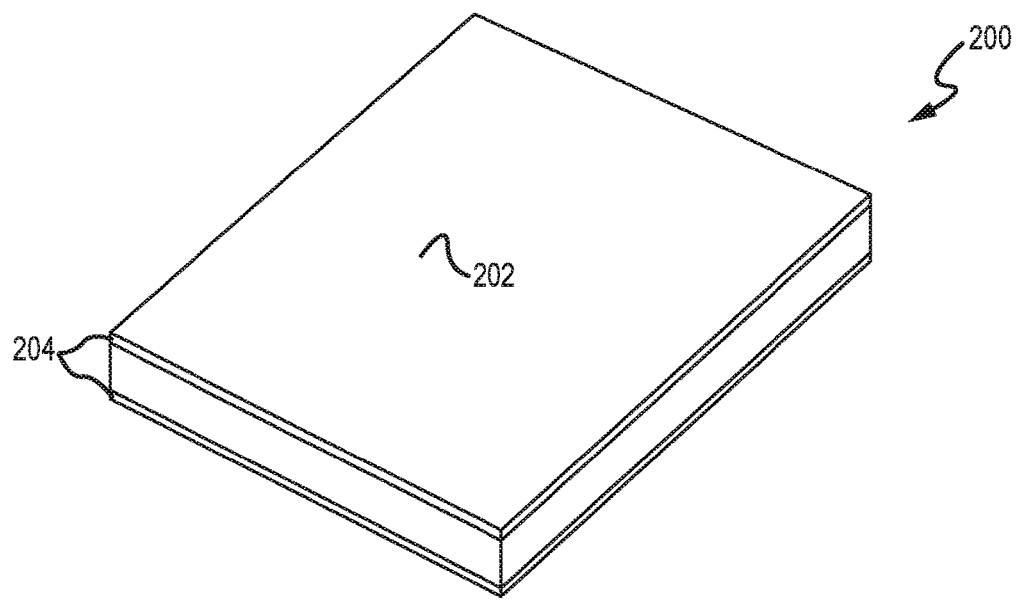
FIGS. 2A-C illustrate roofing boards that may be used in the roofing system of FIG. 1 according to embodiments of the invention.

Referring now to FIG. 2A, illustrated is an embodiment of a roofing board 200 having improved fire resistant properties. Roofing board 200 may be an insulation board 110 or a cover board 106 as previously described. In one embodiment, roofing board 200 is a porous board that may include a core 202 of various compositions of wood fibers, perlite, cellular glass, gypsum, cement boards, magnesium oxide, pressed recycled paper, particle board, and the like. For ease in describing this embodiment, roofing board 200 will be generally referred to as a perlite board 200.

Perlite board 200 may have a composition of roughly 40-70% expanded perlite, 30-60% recycled paper products, 1.5-10% starch binder, 1.0-5% asphalt, and the like. Perlite board 200 may also have a thickness of between about ¼ inch and 3 inches depending on whether the board is to be used for insulation, protective, or other purposes. Perlite board 200 also includes a mineral based coating on one or both major surfaces, which coating is impervious enough to limit the amount of air flow through the board to a roof deck positioned below the perlite board and allow the perlite board 200 to pass the UL 790 Class A burning brand test as described herein. The mineral based material may be applied as a continuous layer of material to suffocate a fire. According to one embodiment, a bottom surface of perlite board 200 that is positioned adjacent a roof deck includes the mineral based coating. In other embodiments, a top and bottom surface of the perlite board 200 may include the coating.

The mineral based material may be applied as a continuous layer in an amount ranging between about 0.05 lbs/ft$^2$ and about 0.70 lbs/ft$^2$, although a range of between about 0.10 lbs/ft$^2$, and 0.20 lbs/ft$^2$ is more common. Exemplary mineral based materials include calcium carbonate, clay, perlite, fiber glass, silica, fly ash, ceramic spheres, cement, gypsum, and the like. Table 1 below provides a non-limiting exemplary mineral based coating formulation.

TABLE 1

Exemplary mineral based coating formulation.

| | Range (w %) | |
|---|---|---|
| Coating Components (wet basis) | | |
| Water | 25 to 50 | Increase water to reduce coat weight |
| Total Solids | 50 to 75 | Increase solids to increase coat weight, board strength and fire resistance |
| Composition (w % of total solids, dry basis) | | |
| Primary Fiber | 44 to 94 | CaCO3, Perlite, Clay, Gypsum, etc. |
| Secondary Fiber | 0 to 20 | Clay, Mica, Talc, Expanded Perlite Fines, Fumed Silica, Fly Ash, Fiber Glass, Vermiculite, Titanium Dioxide, Zinc, Oxide, etc. |
| Fire Retardant | 0 to 20 | Borax, ATH, etc. |
| Sodium Silicate | 5 to 10 | |
| Latex | 1 to 5 | Compatible with sodium silicate |
| Thickener | 0 to 0.5 | xgum, HEC, CMC, associative thickener, etc. |

As shown in Table 1, the mineral based material may include one or more filler materials and/or other additives that are mixed with water. A primary component of the mineral based material may be calcium carbonate, perlite, clay, gypsum, or similar materials. In some embodiments, the mineral based material may include a high percentage (e.g., approximately 90% or so) of calcium carbonate that is mixed with latex (e.g., 6%) and/or sodium silicate. According to a non-limiting specific embodiment, the mineral based material may include approximately 40% water and 60% solids, which consists of a combination of approximately 93% calcium carbonate, 6% sodium silicate, and 1% latex. This combination was found to be effective at providing a substantially impervious coating layer.

The mineral based material may also include an acrylic binder and may or may not include a fire retardant. According to some embodiments, the mineral based material may provide improved fire resistant properties without including a fire retardant. The addition of a fire retardant (e.g., sodium borate, aluminum trihydrate, and the like) in the coating may reduce the coat weight needed for the porous boards 200 to pass the UL Class A tests. However, the addition of such fire retardants is not needed and may be eliminated to reduce additional costs.

According to some embodiments, the mineral based material coatings can be spray applied or metered onto the perlite or porous boards 200 at desired weight and/or thicknesses.

Figure 2B:
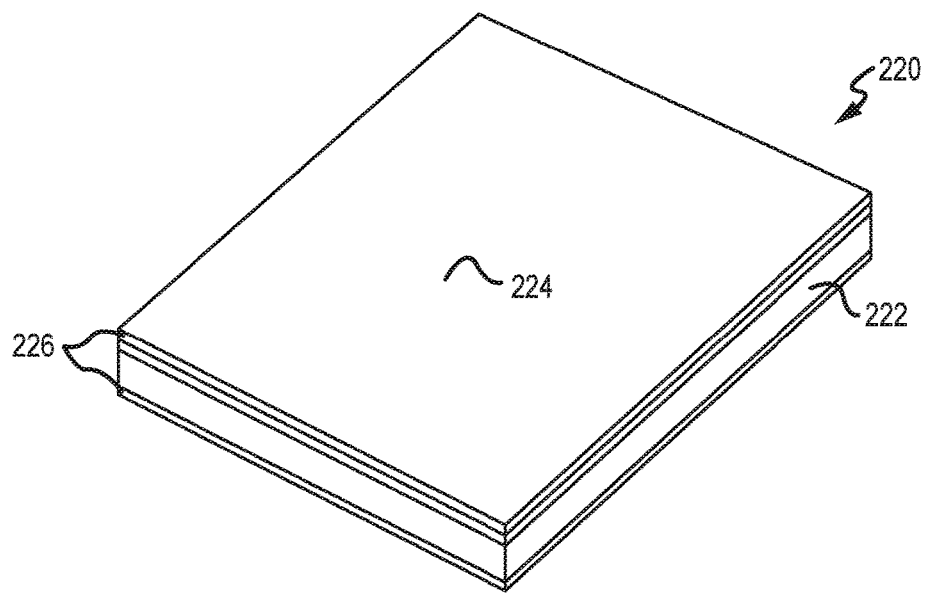

Referring to FIG. 2B, illustrated is an embodiment of a composite roofing board 220 having a core layer 222 reinforced with a nonwoven fiber mat 224. Nonwoven fiber mat 224 may enhance the mechanical properties of roofing board 220, such as by improving the tensile strength and/or wind uplift strength, and/or may mitigate cracking when the nonwoven fiber mat 224 is coated with a mineral based coating as described herein. Core layer 222 may be a porous board having a similar composition and configuration (e.g., thickness) to roofing board 200. The composition and configuration of core layer 222 may be selected based on need and/or application, such as if the board is being used for insulative or protective purposes and the like.

According to one specific embodiment, core layer 222 may be a perlite roofing board and may be reinforced with a glass fiber mat 224. Conventional perlite roofing boards do not include glass fiber mat facers due to difficulties in bonding the materials and the like. The reinforcing glass fiber mat 224 may have a mat weight ranging between about 0.9 lbs/100 ft$^2$ and 3.0 lbs/100 ft$^2$, although a mat weight of between about 1.4 lbs/100 ft$^2$ and 2.0 lbs/100 ft$^2$ is more common. Mat weight of greater than 3.0 lbs/100 ft$^2$ may likewise be used, but are often not desired due to the increased weight. Similarly, mat weights less than 1.0 lbs/100 ft$^2$ may be used, but are often not desired due to a decrease in mat reinforcing properties. Although not shown, roofing board 220 may also include one or more other layers, such as a scrim layer.

The roofing board 200 may or may not include a mineral based coating applied to the glass fiber mat 224. In some embodiments, a binder other than the mineral based material may be used. The mineral based material may have a composition similar to that previously described and may be applied to the glass fiber mat 224 as a continuous layer in an amount of about 0.05 lbs/ft$^2$ or more. The glass fiber mat 224 may provide a relatively smooth continuous surface compared with a conventional perlite board, which may allow less of the mineral based material to be applied. For example, according to one embodiment, a coating weight of about 0.05 lbs/ft$^2$ is applied to a glass fiber mat having a mat weight of about 1.0 lbs/100 ft$^2$. According to another embodiment, a coating weight of about 0.10-0.11 lbs/ft$^2$ is applied to a glass fiber mat having a mat weight of about 1.4 lbs/100 ft$^2$. According to yet another embodiment, a coating weight of about 0.20-0.22 lbs/ft$^2$ is applied to a glass fiber mat having a mat weight of about 2.0 lbs/100 ft$^2$. As can be readily understood, the heavy mat weights typically require a heavier mineral based material coating and, thus, mat weights of greater than about 2.0 lbs/100 ft² may not be desired due to the increased weight and cost of the resulting roofing board.

Figure 4A:
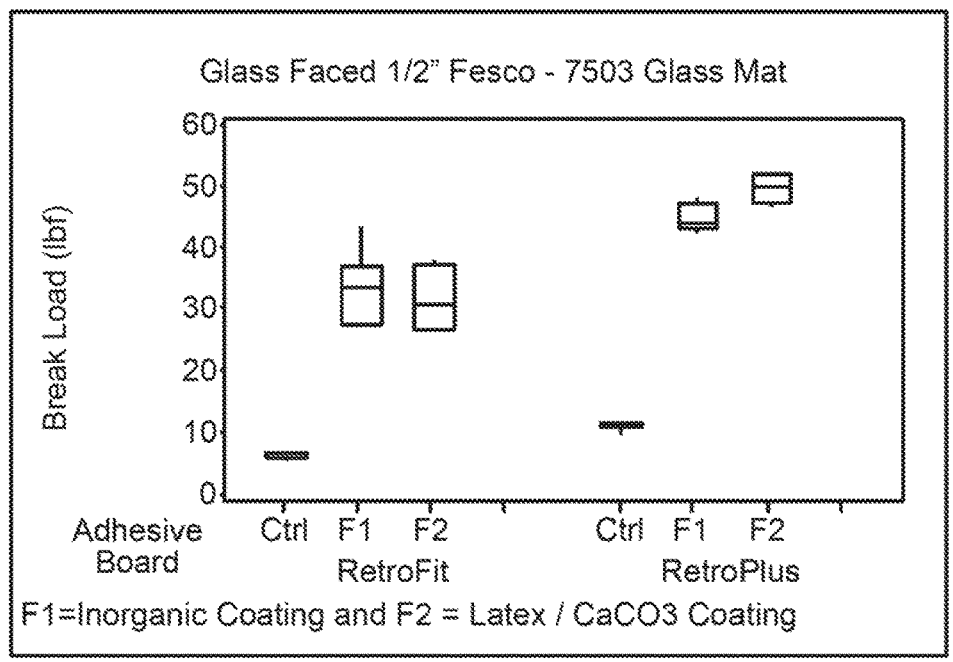
FIGS. 4A & B illustrate graphs showing the improved strength properties of a roofing board having a glass mat facer according to an embodiment of the invention.
Figure 4B:
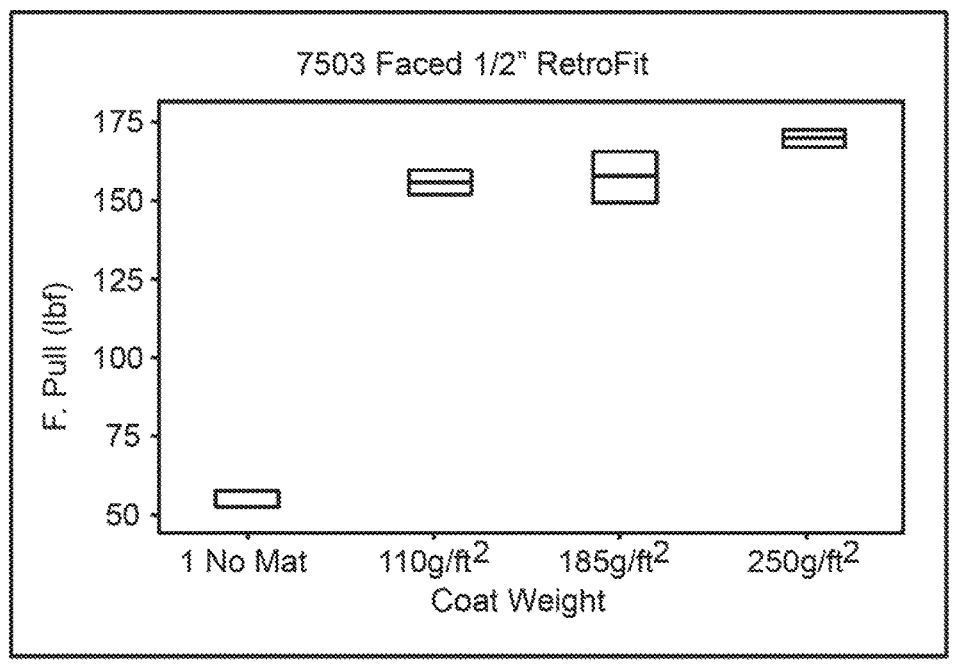

The glass fiber mat facer 224 greatly increases the overall strength of the perlite board 220. For example, as shown in FIG. 4A, a glass fiber mat 224 reinforced perlite board 220 (F1 and F2) exhibits a 300-400% increase in break load when compared with conventional perlite boards (Ctrl). Similarly, as shown in FIG. 4B, glass fiber reinforced perlite boards exhibit approximately 300% or more increase in fastener pull through strengths when compared with conventional perlite boards. FIG. 4B illustrates 3 perlite boards that include a mineral based coating having a coating weight ranging between 110 g/ft² and 250 g/ft², although a significant improvement is not evident between the different coating weights.

According to one embodiment, the reinforced perlite board 220 may be manufactured by applying the mineral based coating or another adhesive to the perlite board and glass fiber mat. Rollers or other means may then press the glass fiber mat into the perlite board. Dryers may then be used to quickly set the coating/adhesive so that the glass fiber mat does not separate from the perlite board when handled. According to some embodiments, the mineral based coating may not provide any wet strength or bond when wet, thus drying may be required immediately after pressing the glass fiber mat into the perlite board.

In some embodiments, the perlite boards may be formed with a Fourdrinier process in 12 foot widths and then dried in a gypsum type dryer. Due to the low strength of wet perlite board entering the oven and the amount of water removed from the perlite board, the application of the glass mat normally occurs after the board exits the dryer and is cut to an approximate width of about 4 feet. The glass fiber mat may then be applied in a finishing process after the perlite board manufacturing process, in which slightly over sized perlite boards (e.g., 4 foot by 8 foot) are butted together for continuous application of the glass fiber mat and mineral based, or other adhesive, coating on one or both sides of the perlite board. The mineral based or adhesive coating may be sprayed or metered onto the perlite board surface. Once the glass fiber mat is applied and the coating is dried, the continuous length of board may be cut to length, such as with a cross cut saw and/or gang saw.

In some embodiments, a foam board manufacturing facility (e.g., polyisocyanurate facility) may be retrofit to manufacture the perlite reinforced board by adding de-stacking capabilities, coating/adhesive applicators, pressing and drying sections between the facer unwind and laminator, and the like. Sufficient drying capacity would likely be needed to set the coating/adhesive prior to entering the laminator. The laminator could be retrofit with compressible belts to apply uniform pressure to the perlite board and produce gaps between metal slats to allow for additional drying. Existing saws and stacking equipment may be used to trim boards to correct dimensions and package. According to this embodiment, the perlite boards may be cut slightly oversized at the perlite plant and shipped to the foam manufacturing facility for subsequent application of glass fiber mat.

Figure 2C:
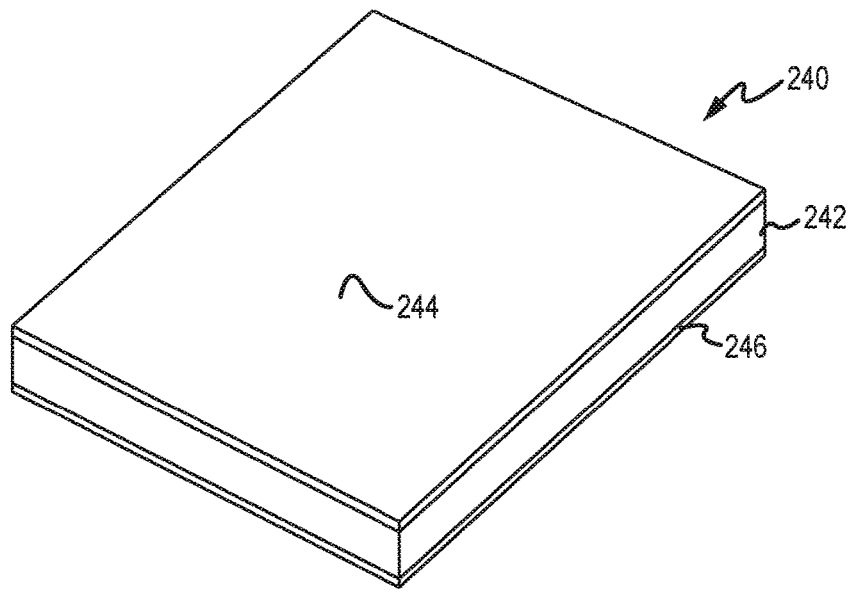

The perlite reinforced boards described herein may provide both strength reinforcement and fire resistant properties. A specific non-limiting application of the perlite reinforced board is in resisting wind uplift forces that a roofing surface may experience. The board may also suffocate a fire as described herein. As shown in FIG. 2C, in some embodiments, the reinforced perlite roofing boards may have glass fiber mats applied to both major surfaces. One or both of these glass fiber mats may be coated with the mineral based material described herein.

Referring now to FIG. 2C, illustrated is another embodiment of a roofing board 240 having improved fire resistance properties. Roofing board 240 include a core material layer 242 sandwiched between two nonwoven facer layers 244 & 246. The core material layer 242 may be any of the previously described roofing boards, such as perlite, gypsum, wood fibers, and the like. In a specific embodiment, core material layer 242 may be a foam material, such as polyisocyanurate, polystyrene, expanded or extruded polystyrene, and the like (referred to hereinafter as foam board 242 for convenience). One or both of the outer facer layers, 244 & 246, may be coated with the mineral based material described herein. In a specific embodiment, a bottom facer 246 of roofing board 240 may include a heavy coating of the mineral based material, while a top facer 244 include a lighter coating of the mineral based material or another material. The heavily coated bottom facer 246 may be positioned directly atop and adjacent a roof deck (not shown).

Foam board 242 may have a density of between about 1.5 and 12 lbs/100 ft³ (pcf), although densities between about 1.5 and 8 lbs/100 ft³ are more common. In some embodiments, a foam density of up to 25 lbs/ft³ is possible, but may be less economically feasible. The thickness and/or density of the foam may be varied, typically between about ¼ inch and 6 inches, depending on the required use and/or application of the foam board 242. For example, ¼ to ½ inch thick high density boards can be produced for cover board applications where impact resistance and other protective properties are needed. Alternatively, lower density and thicker foam boards (e.g., ½ to 6 inches) with higher R values may be produced for insulation board purposes.

Top and bottom facers, 246 & 244, may be glass fiber mats according to one embodiment. The two facers may have roughly the same or similar mat weight, or may have different mat weights. For example, in one embodiment, top facer 244 is a relatively light weight or conventional glass fiber mat while bottom facer 246 is a relatively heavy glass fiber mat. In such embodiments, top facer 244 may have a mat weight ranging between about 1.2 lbs/100 ft² and 1.8 lbs/100 ft², while bottom facer 246 has a mat weight ranging between about 1.4 lbs/100 ft² and 3 lbs/100 ft². In a specific embodiment, bottom facer 246 has a mat weight of about 2.1 lbs/100 ft².

The thicknesses of the facers may vary as well. For example, top facer 244 may have a thickness of about 0.025 inches or less while bottom facer has a thickness of up to about 0.30 inches or more. In other embodiments, both top facer 244 and bottom facer 246 may be relatively heavy thick glass fiber mats. Conventional foam boards typically do not include facer having such mat weights and thicknesses due to the increased cost and weight of the resulting roofing board.

The bottom facer 246 of foam board 242 may be coated with a heavy coating of the mineral based material. According to one embodiment, a heavy coating may be a coating having a coating weight of at least 10 lbs/100 ft² (i.e., 0.10 lbs/ft²). According to another embodiment, a heavy coating may be any coating having a coating weight of at least 14 lbs/100 ft² (i.e., 0.14 lbs/ft²). Top facer 244 may also be coated with the mineral based coating or another material. A heavy coating as described herein may be applied to the top facer, or in some embodiments, a lighter coating may be applied. The light coating may be any coating having a coating weight of less than 10 lbs/100 ft² (i.e., less than 0.10 lbs/ft²), or in other embodiments, a coating weight of less than 14 lbs/100 ft² (i.e., less than 0.14 lbs/ft²). In a specific embodiment, a continuous coating of the mineral based material is applied to bottom facer 246 so that roofing board 240 has a coating weigh to between about 14 and 30 lbs/100 ft², or more commonly between about 18 and 21 lbs/100 ft². The thicker and heavier glass fiber mats described above may allow the heavier mineral based coating to be applied to the bottom facer 246. In other embodiments, both top facer 244 and bottom facer 246 may include heavy mineral based coatings. In some embodiments, foam board 242 may require a top and bottom facer, 244 and 246, to prevent curling of the foam board 242 when exposed to heat.

The heavier and thicker bottom facer 246 having the heavy mineral based coating may be positioned adjacent a roof deck to limit the air flow to the underlying roof deck and thereby suffocate a fire or prevent flame spread. The heavy coated bottom facer 246 and/or top facer 244 enable the roofing board 240 to pass the UL 790 Class A test. These facers may minimize shrinkage of the foam board core 242 when exposed to a fire's heat and/or flame and thereby minimizing the formation of any gaps or voids through which air can flow. The heavily coated foam composite boards may not require the use of a fire retardant, although a fire retardant may be used in some embodiments, which may reduce the amount of the mineral based material that needs to be applied.

The heavy coated facer or facers may limit airflow regardless of the thickness and/or foam density of foam board 242. Thus, these facers may be used for virtually any foam board to enable the boards to pass the UL 790 Class A tests. Further, although possible, it is not necessary to face a foam board 242 on both sides with a heavy coated glass mat to enable the foam board 242 to pass the UL 790 Class A test. Rather, facing a bottom surface that is positioned adjacent to a roof deck is normally all that is needed to enable passage of the test. Stated differently, a light or standard weight coated glass facer may be used on a top surface that is ultimately exposed to a flame or the burning brand. In this manner, costs and/or the weight of the resulting roofing board 240 may be minimized. Expensive fire resistant fillers like Aluminum Tri-Hydrate, Borax, and the like, are also not required to enable the roofing board to pass the UL 790 Class A test, which may provide further cost savings.

Table 2 below shows UL 790 Class A burning brand test results for various foam board compositions. As shown in Table 2, standard foam composite board having light or standard weight facers failed the test, usually prior to the brand being 100% consumed and within the first 20 minutes of the test. In contrast, foam composite boards having a heavier coated glass facer (CGF) on the bottom surface or on both surfaces, passed the test. In each case the brand was 100% consumed and only in 1 case did the test require the full 90 minutes allowed. The heavier coated glass facer allowed the foam boards to pass the test regardless of foam density, which ranged from 1.8 pcf to 6 pcf, and regardless of foam thickness, which ranged from ¼ inch to 2 inches.

TABLE 2

UL 790 Class A burning brand test results.

| Foam Composite Board | Foam Density | Brand Consumption | Time to No Smoke | Time to Flame Underneath Deck | | Test Conditions |
|---|---|---|---|---|---|---|
| ¼" thick, standard Coated Glass Facers (CGF) on both sides | 6 pcf | 80% | NA | at 10 min. | FAIL | Class A Brand, small scale E108 test deck, 1" slope |
| ¼" thick, standard CGF on both sides | 6 pcf | 90% | NA | at 21 min. | FAIL | Class A Brand, UL790, 0.5" slope |
| ¼" thick, heavier CGF on both sides | 5 pcf | 100% | 37 min. | No | PASS | Class A Brand, UL790, 1" slope |
| ¼" thick, heavier CGF on both sides | 5 pcf | 100% | 39 min. | No | PASS | Class A Brand, UL790 3" slope |
| ¼" thick, heavier CGF on bottom side, standard CGF on top side | 5 pcf | 100% | 50 min. | No | PASS | Class A Brand, UL790 3" slope |
| ¼" thick, heavier CGF on bottom side, standard CGF on top side | 5 pcf | 100% | 87 min. | No | PASS | Class A Brand, UL790 3" slope |
| ¼" thick, heavier CGF on bottom side, standard CGF on top side | 5 pcf | 100% | 44 min. | No | PASS | Class A Brand, UL790 3" slope |
| ¼" thick, heavier CGF on bottom side, standard CGF on top side | 5 pcf | 100% | 90 min. | No | PASS | Class A Brand, UL790 3" slope |
| 2" thick, standard CGF on both sides | 1.62 pcf | 25% | NA | 6 min. | FAIL | Class A Brand, small scale E108 test deck, 1" slope |
| 1" thick, standard CGF on both sides | 1.8 pcf | 15% | NA | 4 min. | FAIL | Class A Brand, small scale E108 test deck, 1" slope |
| 1.5" thick, heavier CGF on both sides | 1.8 pcf | 100% | 36 min. | No | PASS | Class A Brand, small scale E108 test deck, 1" slope |
| 1.5" thick, heavier CGF on bottom side, standard CGF on top side | 1.8 pcf | 100% | 46 min. | No | PASS | Class A Brand, small scale E108 test deck, 1" slope |

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A roofing system comprising:
a roofing board, wherein the roofing board comprises a composite core material comprising:
between 40% and 70% of expanded perlite;
between 30% and 60% of paper products;
between 1.5% and 10% of a starch binder; and
between 1.0% and 5% asphalt; and
a mineral based material coating applied to one or more major surfaces of the roofing board, the mineral based material coating being applied in an amount between the range of about 0.05 lbs/ft$^2$ and about 0.70 lbs/ft$^2$.

2. The roofing system of claim 1, wherein:
the roofing board comprises one or more of the following materials:
wood fibers;
perlite;
polyisocyanurate;
polystyrene;
extruded polystyrene;
cellular glass; or
gypsum.

3. The roofing system of claim 1, wherein:
the roofing board comprises a foam core sandwiched between two nonwoven facer material layers.

4. The roofing system of claim 1, further comprising:
a roofing membrane configured to be positioned atop the roofing board and coupled therewith.

5. The roofing system of claim 4, wherein the roofing membrane comprises one or more of:
polyvinyl chloride (PVC);
thermoplastic polyolefin (TPO);
ethylene propylene diene monomer rubber (EPDM); or
bitumen.

6. The roofing system of claim 1, further comprising:
a roof deck, wherein the roofing board is configured to be positioned atop the roof deck and coupled therewith.

7. The roofing system of claim 1, further comprising:
a glass fiber mat coupled with a major surface of the roofing board, the glass fiber mat being saturated with the mineral based material coating.

8. The roofing system of claim 1, wherein the roofing board further comprises:
a glass mat facer coupled with one surface of the composite core, the glass mat facer having a mat weight per unit area of between about 0.9 and 3.0 lbs/100 ft$^2$.

9. The roofing system of claim 1, wherein:
the mineral based material coating comprises between about 25% and 50% water and between about 50% and 75% of a composition of solid materials;
the solid materials comprise between about 44% and 94% calcium carbonate, between about 5% and 10% sodium silicate, and between about 1% and 5% of latex; and
the coating limits air flow through the roofing board, thus enabling the roofing board to pass the UL 790 class A tests.

10. A roofing system comprising:
a roofing board; and
a mineral based material coating applied to one or more major surfaces of the roofing board, wherein:
the mineral based material coating comprises between about 25% and 50% water and between about 50% and 75% of a composition of solid materials;
the solid materials comprise between about 44% and 94% calcium carbonate, between about 5% and 10% sodium silicate, and between about 1% and 5% of latex; and
the coating limits air flow through the roofing board, thus enabling the roofing board to pass the UL 790 class A tests.

11. A method of manufacturing a roofing board comprising:
providing a roofing board, applying a mineral based material to at least one major surface of the roofing board, the mineral based material being applied such that the roofing board comprises a coating weight per unit area of between about 0.05 lbs/ft$^2$ and about 0.70 lbs/ft$^2$, wherein:
the mineral based material coating comprises between about 25% and 50% water and between about 50% and 75% of a composition of solid materials;
the solid materials comprise between about 44% and 94% calcium carbonate, between about 5% and 10% sodium silicate, and between about 1% and 5% of latex; and
the coating limits air flow through the roofing board, thus enabling the roofing board to pass the UL 790 class A tests.

12. The method of manufacturing a roofing board of claim 11, further comprising:
securing a roofing membrane to the roofing board.

13. The method of manufacturing a roofing board of claim 11, further comprising:
coupling a glass mat to at least one major surface of the roofing board using an adhesive such that the at least one major surface is faced with the glass mat.

14. The method of manufacturing a roofing board of claim 13, further comprising:
applying the mineral based material to the faced glass mat surface of the roofing board.

15. The method of manufacturing a roofing board of claim 13, further comprising:
applying a second glass mat to the other major surface of the roofing board such that both major surfaces of the roofing board are faced with a glass mat; and
applying a coating to the other faced glass mat surface of the roofing board, the coating being applied so as to comprise a coating weight per unit area of less than 0.10 lbs/ft$^2$.

16. The method of manufacturing a roofing board of claim 14, wherein:
the faced glass mat comprising the coating weight per unit area of at least 0.10 lbs$^2$ faces a roof deck.

17. The method of manufacturing a roofing board of claim 11, wherein:
the mineral based material comprises between about 25% and 50% water and between about 50% and 75% of a composition of solid materials when applied;
the coating is approximately 100% solids after drying.

18. The method of manufacturing a roofing board of claim 17, wherein:
the solid materials further comprise one or more of clay, perlite, fiber glass, silica, fly ash, ceramic spheres, cement, vermiculite, titanium dioxide, zinc oxide, or gypsum.

19. The method of manufacturing a roofing board of claim 11, wherein the roofing board comprises:
a composite core material comprising:
between 40% and 70% of expanded perlite;
between 30% and 60% of paper products;
between 1.5% and 10% of a starch binder; and
between 1.0% and 5% asphalt.

20. The method of manufacturing a roofing board of claim 11, wherein:
the roofing board comprises a foam core sandwiched between two nonwoven facer material layers.

* * * * *